United States Patent
Allston et al.

[19]

[11] Patent Number: 6,019,113
[45] Date of Patent: *Feb. 1, 2000

[54] METHOD AND APPARATUS FOR CONTROLLING A SHAPE MEMORY ALLOY FUEL INJECTOR

[75] Inventors: Brian Keith Allston, Rochester; Albert Martin Knebel, Holcomb; Michael Raymond Salemi, Rochester, all of N.Y.

[73] Assignee: General Motors Corporation, Detroit, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 09/178,958

[22] Filed: Oct. 26, 1998

[51] Int. Cl.$^7$ ............................ F16K 31/00; F16K 31/02; E03B 1/00
[52] U.S. Cl. .......................... 137/1; 251/11; 251/129.01; 60/527
[58] Field of Search ................................ 257/129.01, 11; 60/528, 527; 137/1

[56] References Cited

U.S. PATENT DOCUMENTS

| | | | |
|---|---|---|---|
| 3,229,956 | 1/1966 | White | 251/11 |
| 3,400,906 | 9/1968 | Stocklin | 251/11 |
| 3,613,732 | 10/1971 | Willson et al. | 251/11 |
| 3,974,844 | 8/1976 | Pimentel | 251/11 |
| 4,551,974 | 11/1985 | Yaeger et al. | 60/527 |
| 4,736,587 | 4/1988 | Suzuki | 251/11 |
| 4,747,887 | 5/1988 | Honma . | |
| 4,973,024 | 11/1990 | Homma | 251/11 |
| 5,211,371 | 5/1993 | Coffee | 251/11 |
| 5,325,880 | 7/1994 | Johnson et al. | 251/129.01 |
| 5,619,177 | 4/1997 | Johnson et al. | 251/129.01 |

Primary Examiner—Denise L. Ferensic
Assistant Examiner—Joanne Y. Kim
Attorney, Agent, or Firm—Vincent A. Cichosz

[57] ABSTRACT

An improved method and apparatus for opening and closing a high performance shape memory alloy (SMA) fuel injector that minimizes performance variations due to changes in ambient temperature. When opening the injector to commence fuel injection, a relatively high voltage is applied to an SMA element of the injector to quickly heat the element to its high temperature state, quickly opening the valve. The current level is monitored as a measure of the element resistivity, and when the determined resistivity indicates that the high temperature state transition is complete, the voltage is reduced to a hold value, sufficient to continue resistivity measurement. When the determined resistivity indicates that the element is beginning to transition back to the ambient temperature state, the high voltage is re-applied to begin a new control cycle. To close the injector, the electric heating is discontinued, and fuel circulating through the injector cools the element to its ambient temperature state. The variability in opening response is reduced because the high voltage is significantly higher than a voltage that would thermally damage the SMA element if sustained, and the resistivity feedback during application of the high voltage is used to control the timing of the current reduction. The variability in closing response is reduced by the repeated switching between high and low voltage control, which controls the temperature of the element, and thereby maintains the element in a state of readiness to return to the ambient temperature state. Additionally, the repeated switching between high and low voltage control limits the peak temperature of the SMA element, and prevents damage to the element if the circulating fuel fails to adequately cool the element. Finally, the use of current measurement in the control circuit permits reliable determination of the resistivity of the SMA element without requiring external thermal sensors.

11 Claims, 3 Drawing Sheets

_6,019,113_

METHOD AND APPARATUS FOR CONTROLLING A SHAPE MEMORY ALLOY FUEL INJECTOR

TECHNICAL FIELD

This invention relates to the control of a fuel injector incorporating a shape memory alloy actuator element, and more particularly to a method and apparatus for maximizing performance of the injector while minimizing variability.

BACKGROUND OF THE INVENTION

Shape memory alloy (SMA) elements exhibit a temperature related shape transformation corresponding to an inherent bi-stable crystalline structure. This characteristic has been used to advantage in various control devices, with the temperature of the SMA element being controlled by electric heating. For example, it has been proposed to use an SMA element to move an armature for opening and closing a fluid valve, such as described in the U.S. Pat. No. 4,973,024, issued on Nov. 27, 1990, and in the U.S. Pat. No. 5,325,880, issued on Jul. 5, 1994. The control of these and other SMA devices may be either open-loop (i.e., based on experimentally determined characteristics of the device) or closed-loop (i.e., based on a feedback signal related to the parameter being controlled). Additionally, or alternatively, the resistance of the SMA element can be monitored for feedback purposes, as mentioned in the above-referenced U.S. Pat. No. 5,325,880, since the SMA material exhibits a characteristic change in resistivity during its shape transformation.

The application of SMA materials to a precision metering device such as an automotive fuel injector presents a significant challenge in terms of control since the performance of the device tends to vary substantially with ambient temperature. Although the ambient temperature variation can be mitigated to a degree in such an application by cooling the SMA element with circulation of excess fuel through the injector, the fuel temperature still varies significantly depending on ambient conditions. The control techniques alluded to above are not satisfactory since the device characteristics change with temperature and the controlled parameter cannot be directly measured for feedback purposes. Accordingly, what is needed is a control that causes the valve to open quickly and fully, and then close quickly, with minimum variability.

SUMMARY OF THE INVENTION

The present invention is directed to an improved method and apparatus for opening and closing a high performance SMA fuel injector, wherein performance variations due to changes in ambient temperature are minimized. When opening the injector to commence fuel injection, a relatively high voltage is applied to an SMA element of the injector to quickly heat the element to its high temperature state, quickly opening the valve. The current level is monitored as a measure of the element resistivity, and when the determined resistivity indicates that the high temperature state transition is complete, the voltage is reduced to a hold value, sufficient to continue resistivity measurement. When the determined resistivity indicates that the element is beginning to transition back to the ambient temperature state, the high voltage is re-applied to begin a new control cycle. To close the injector, the electric heating is discontinued, and fuel circulating through the injector cools the element to its ambient temperature state.

The variability in opening response is reduced because the high voltage is significantly higher than a voltage that would thermally damage the SMA element if sustained, and the resistivity feedback during application of the high voltage is used to control the timing of the current reduction. The variability in closing response is reduced by the repeated switching between high and low voltage control, which controls the temperature of the element, and thereby maintains the element in a state of readiness to return to the ambient temperature state. Additionally, the repeated switching between high and low voltage control limits the peak temperature of the SMA element, and prevents damage to the element if the circulating fuel fails to adequately cool the element, or in the event that no fuel is available to cool the SMA element. Finally, the use of current measurement in the control circuit permits reliable determination of the resistivity of the SMA element without requiring external thermal sensors.

BRIEF DESCRIPTION OF THE DRAWINGS

FIG. 1A shows the actuator in an open state, and FIG. 1B shows the actuator in a closed state.

DESCRIPTION OF THE PREFERRED EMBODIMENT

Figure 1A:
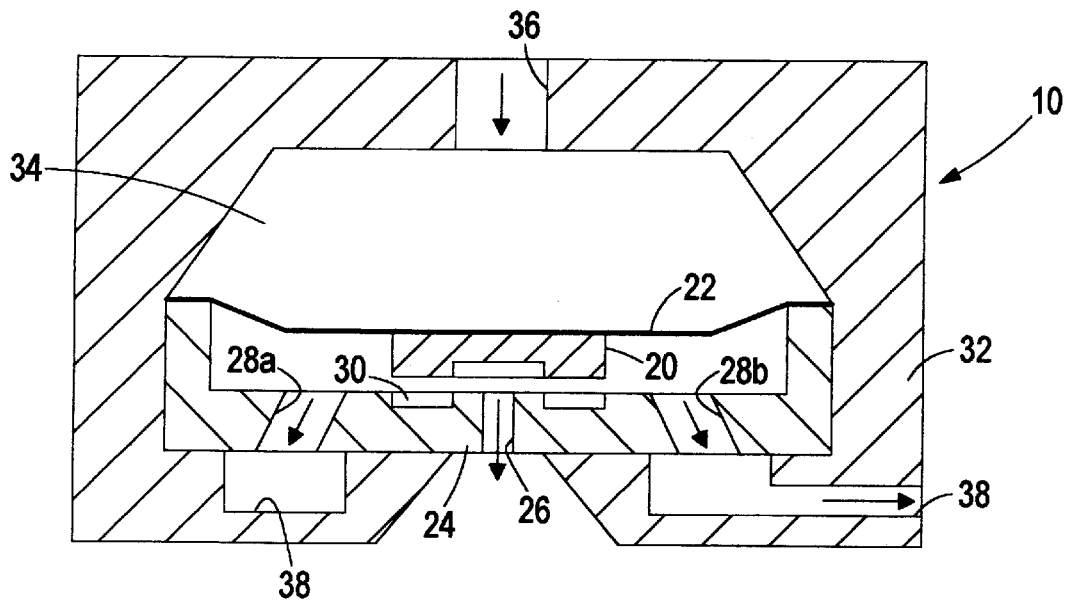
FIGS. 1A–1B are cross-sectional diagrams of a fuel injector actuator having a fuel cooled SMA element according to this invention.
Figure 1B:
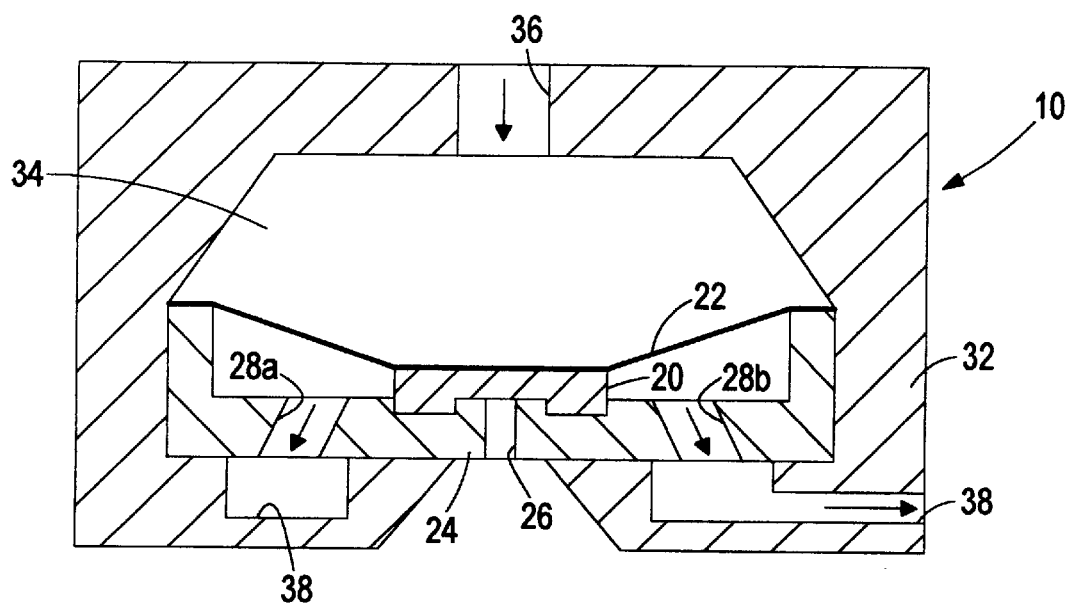

Referring to the drawings, and particularly to FIGS. 1A–1B, the reference numeral 10 generally designates an actuator for an automotive fuel injector, including a valve 20 and a Shape Memory Alloy (SMA) element 22 in contact with valve 20. The SMA element 22 is supported on a metering plate 24 having an orifice 26 and a pair of outlet flow paths 28a, 28b disposed on either side of the orifice 26. In general, the valve can be positioned upward as shown in FIG. 1A to open the orifice 26, or downward as shown in FIG. 1B to close the orifice 26. An annular recess 30 surrounding the orifice 26 receives a complementary portion of valve 20 when the actuator 10 is in the closed position of FIG. 1B. A housing element 32 surrounding the metering plate 24 defines a fuel cavity 34, an inlet flow path 36, and an annular outlet flow path 38 coupled to the outlet flow paths 28a, 28b. The orifice 26 is coupled to the intake chamber of an internal combustion engine, and the outlet flow path 38 is coupled to a fuel reservoir. Fuel enters through inlet flow path 36 and fills the cavity 34. If valve 20 is open, a portion of the fuel passes through orifice 26, and the excess fuel is returned to the reservoir via outlet flow path 38. In the illustrated embodiment, the system is designed so that there is a continuous flow of fuel across the SMA element 22 in either position of the valve 20. The circulating fuel flow quickly cools the SMA element 22 to the ambient temperature of the fuel in the reservoir.

In the illustrated embodiment, the actuator 10 is designed so that the valve 20 is biased to the closed position shown in FIG. 1B when SMA element 22 is in an ambient temperature state at or below a first characteristic temperature (referred to as the martensite finish temperature Tmf). When heated to a second characteristic temperature (referred to as the austenite start temperature Tas) by electric resistance heating, the SMA element 22 begins a crystalline phase change, which is completed when the SMA element reaches a third characteristic temperature (referred to as the austenite finish temperature Taf). During this phase change, the SMA element shrinks in length to move valve 20 to the open position depicted in FIG. 1A. Thus, the SMA element 22 is heated by electric resistance heating to open the valve 20, and when the heating is terminated, the SMA element 22 is cooled by the flow of ambient temperature fuel through the cavity 34 to close the valve 20. Although in the illustrated embodiment, the valve 20 is in the closed position at ambient fuel temperature, and in the open position when SMA element 22 is heated, it will be understood the actuator 10 could just as well be designed so that the valve 20 is open at ambient fuel temperature and closed when SMA element 22 is heated.

With certain SMA materials, an intermediate phase (referred to as the Rhombohedral-Phase or R-Phase) is encountered as the temperature of the material is increased and the crystalline structure begins to change phase. With such materials, the martensite crystal structure initially changes to the R-Phase crystal structure followed by the austenite crystal structure. The R-Phase crystal structure may also be encountered when the material is subsequently cooled.

Figure 2:
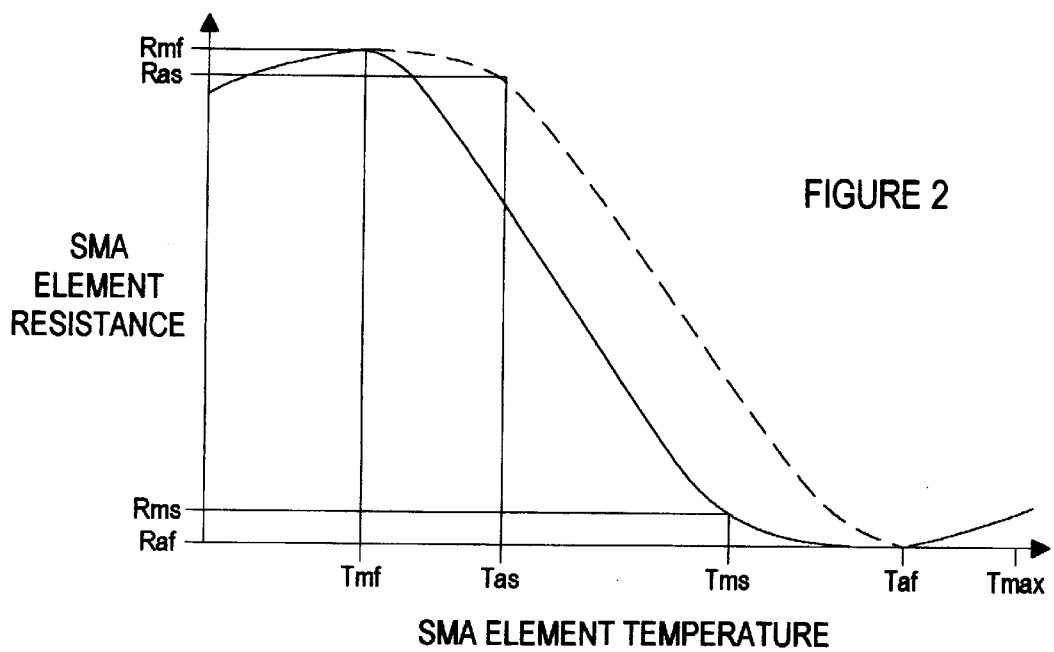
FIG. 2 is a graph illustrating a characteristic resistivity vs. temperature relationship of the SMA element of FIG. 1.

In the course of the above-described crystalline phase changes, there are characteristic changes in both the shape and the resistivity of the element 22. FIG. 2 shows the resistance of element 22 as a function of temperature, as the temperature is varied from the martensite finish temperature Tmf to the austenite finish temperature Taf. The relationship for increasing temperatures (i.e., martensitic to austenitic) is shown by the broken trace A, whereas the relationship for decreasing temperatures (i.e., austenitic to martensitic) is shown by the solid trace B. At the martensite finish temperature Tmf, the element 22 has an electrical resistance designated as Rmf. As the element temperature increases due to electrical resistance heating, its resistance increases due to the thermal coefficient of resistance of the martensite phase. At the austenite start temperature Tas, the slope of the resistance vs. temperature curve changes due to the start of the crystalline phase change from martensite to austenite. Once the element is heated to the austenite finish temperature Taf, the slope of the resistance vs. temperature curve again changes to reflect the pure austenitic phase resistivity. Increasing the temperature above the austenite finish temperature Taf results in further increases in resistivity due to the thermal coefficient of resistance of the austenite phase.

In controlling the actuator 10, maximum performance is achieved by quickly heating the element 22 at the start of the injection signal to quickly and fully open the valve 20, and quickly cooling the element 22 at the end of the injection signal to quickly and fully close the valve 20. Fast heating of the element 22 can be effected by passing a large current through it, but overheating must be avoided to prevent thermal damage to the element. Also, overheating the element (even without thermal damage) impairs the ability to quickly cool the element 22 for closing the valve 20. Consequently, the conventional approaches to heating and cooling SMA elements involve significant trade-offs that sacrifice the performance of the controlled device.

This invention overcomes the above-described problems by controlling the injector 10 such that the element 22 is quickly heated with high power at the start of the injection enable signal, and the heating is modulated once the injector has opened to maintain the temperature of the element 22 at some predetermined level above the austenitic finish temperature Taf. The modulation permits the use of high power to quickly open the injector 10, while preventing overheating of the element 22, and thereafter maintains the element 22 in a state of readiness to be cooled by the circulating fuel at the end of the injection signal. As a result, the only factors affecting the performance of the injector and the variability in opening and closing are environmental in nature i.e., the temperature of the fuel. As an additional improvement, the variability associated with different fuel temperatures can be significantly reduced by varying the holding temperature of the SMA element in accordance with the fuel temperature. This can be accomplished either with discrete circuitry providing temperature feedback, or with a microprocessor-based controller through the use of a look-up table based on fuel temperature or a related parameter developed for other engine controls.

Figure 3:
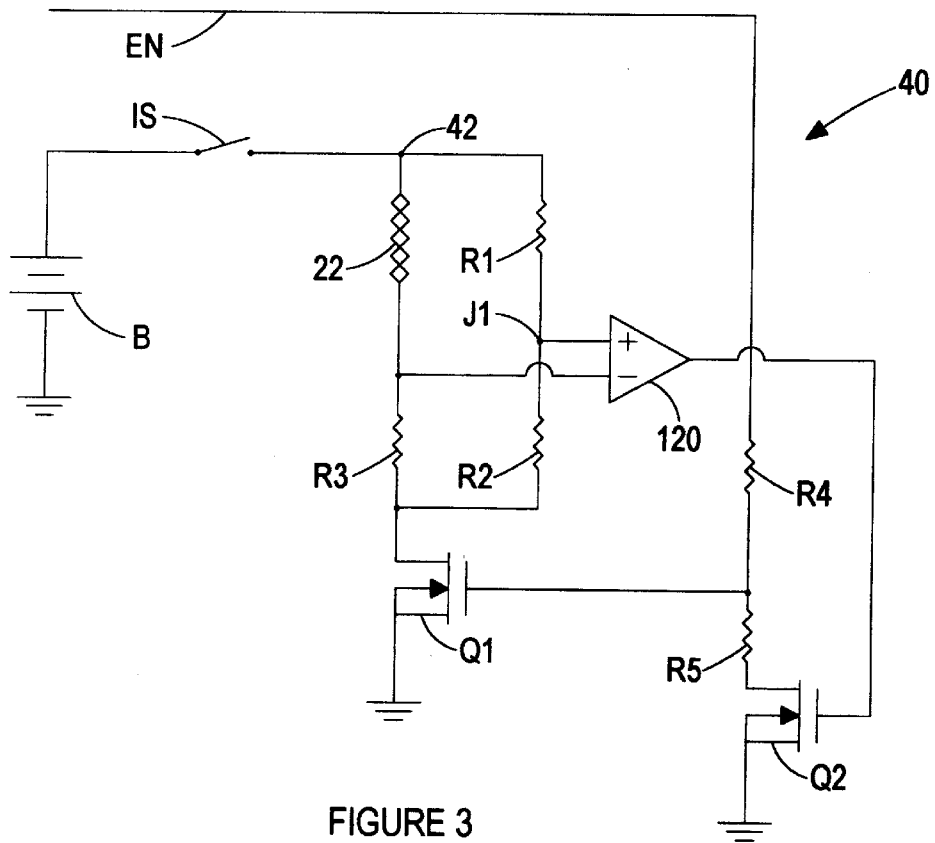
FIG. 3 is a circuit diagram of a driver circuit for the actuator of FIG. 1.

FIG. 3 depicts the SMA element 22 and an injector driver circuit 40 for controlling the heating of SMA element 22 in an automotive environment. An automotive storage battery B is coupled to terminal 42 of driver circuit 40 via ignition switch IS. The driver circuit includes a power FET Q1, a bias FET Q2, the bridge resistors R1-R3 and the bias resistors R4-R5. One end of element 22 is connected to terminal 42, and the other end is connected to ground (the negative terminal of battery B) via bridge resistor R3 and the drain-source circuit of power FET Q1. An injection enable signal EN is coupled to the gate of power FET Q1 via bias resistor R4. The serially coupled bridge resistors R1 and R2 are connected in parallel with the series combination of element 22 and bridge resistor R3, defining a reference voltage at junction J1. The reference voltage at the junction J1 is applied to the non-inverting input of comparator 120, and the voltage at a junction J2 between element 22 and bridge resistor R3 is applied to the inverting input of comparator 120. The output of comparator 120 operates bias FET Q2, which couples the bias resistor R4 to ground through bias resistor R5 and its own drain-source circuit.

When the injector signal transitions from a logic zero to a logic one, the power transistor Q1 is biased to a fully conductive state through bias resistor R4, sourcing maximum current from battery B through element 22 and bridge resistor R3. Bridge resistor R3 serves as a shunt resistor, and has a value of about 100 mΩ, for example. Thus, the voltage at junction J2 decreases as the resistance of element 22 increases during its transition from martensitic to austenitic crystalline structure, described above.

When the voltage at junction J2 falls below a reference voltage (at junction J1) the comparator 120 switches to a low impedance output state, sourcing current from the gate of bias transistor Q2 to bias transistor Q2 conductive. The bridge resistors R1 and R2 are chosen so that the comparator 120 switches when the resistance of element 22 reaches its specified resistance value Rc. This is achieved by selecting a suitable value of resistor R2, and setting resistor R1 according to the expression: (Raf)(R2)/R3.

When the comparator 120 switches to a low impedance state as described above, the bias transistor Q2 lowers the bias voltage of power transistor Q1 through bias resistor R5. This switches power transistor Q1 to a low current state in which the current sourced through element 22 is reduced to a relatively low level, such as 100 mA, that permits partial cooling of the element 22 by the circulating fuel. When the cooling causes the voltage at the junction of bridge resistor R3 and element 22 to once again exceed the reference voltage at junction J1, the comparator 120 will switch back to its high impedance state, turning off bias transistor Q2, and returning power transistor Q1 to its fully conductive state. The comparator 120 continues to switch in this manner so long as the injection signal remains at a logic one level, thereby limiting the peak temperature of element 22 to the control temperature Tc. The switching rate during such operation is determined as a function of fuel temperature (cooling rate) and the hysteresis of comparator 120. When the injection signal transitions to a logic zero level, the power transistor Q1 is biased off, allowing the fuel to cool the element 22 to its martensitic finish temperature, closing the actuator 10.

Figure 4:
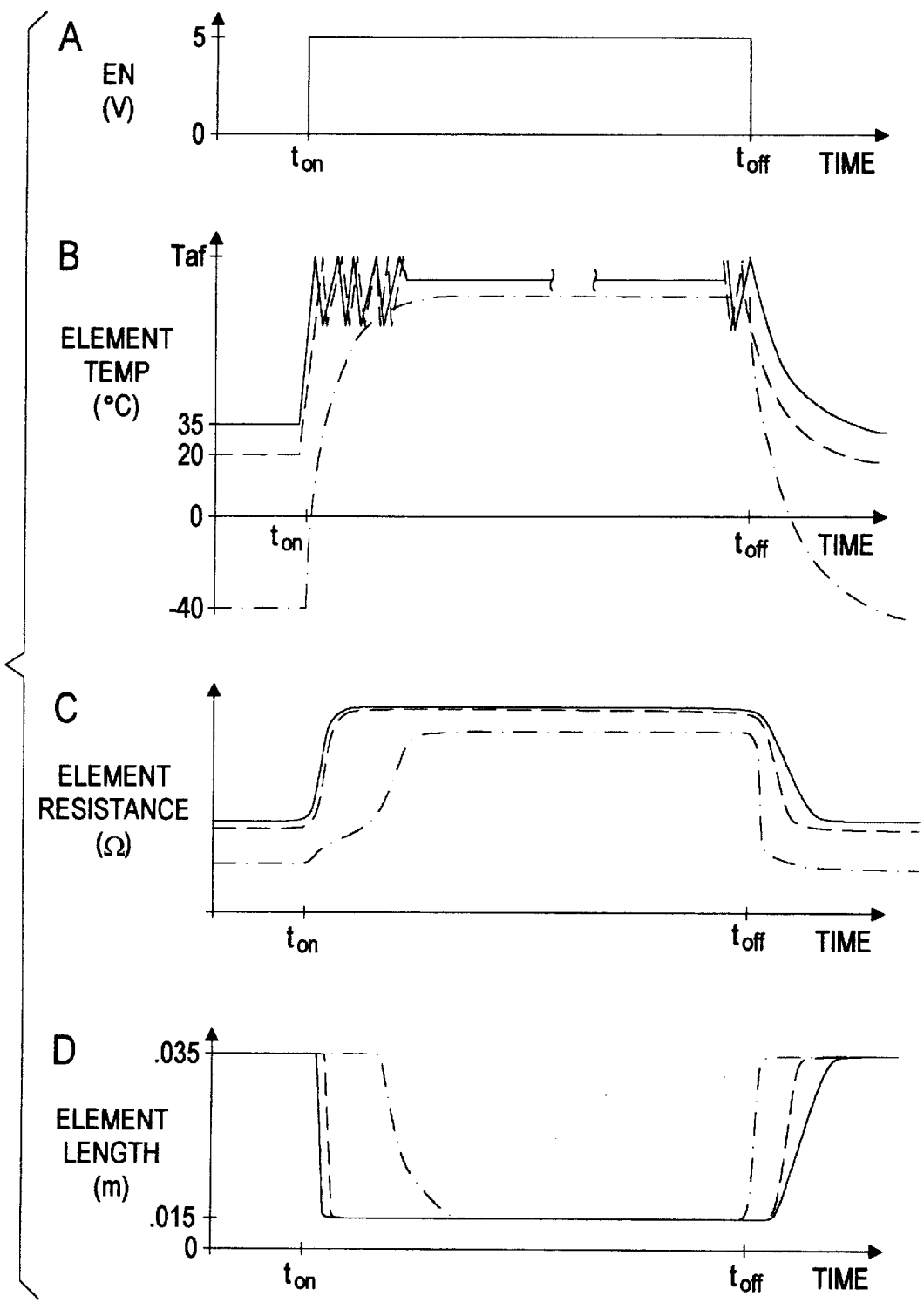
FIG. 4, Graphs A–D, depict the operation of the actuator of FIG. 1 at three different ambient fuel temperatures.

FIG. 4, Graphs A–D, graphically depict an injection cycle of actuator 10 according to this invention. Graph A depicts a logic level injection signal, Graph B depicts the temperature of element 22, Graph C depicts the resistance of element 22, and Graph D depicts the length of the element 22. Multiple traces are shown in Graphs B–D to illustrate the variability associated with three different fuel temperatures: 35° C. (solid traces), 20° C. (dashed traces), and −40° C. (dash-dot traces). It is seen that the high apply voltage causes a quick increase in element temperature, minimizing valve opening variability, even at very cold fuel temperatures. At warmer fuel temperatures, the cycling of transistor Q1 between its high and low current states controls the temperature of the element 22 so that is can be quickly cooled to close the valve when the transistor Q1 is turned off.

In summary, the above described control enables high performance operation of a SMA fuel injector. Through the use of resistance feedback, the element may be quickly heated without thermal damage to quickly open the injector, and maintained in a state of thermal readiness so that the injector can be quickly and consistently cooled at the end of the injection period. While described in reference to the illustrated embodiment, it will be understood that various modifications in addition to those suggested above will occur to those skilled in the art. In this regard, it will be understood that the invention is not limited to the illustrated embodiment, and that controls incorporating such modifications may fall within the scope of this invention, which is defined by the appended claims.

We claim:

1. A control method for activating an actuator having a SMA element that assumes a deactivated state at ambient temperature and an activated state at an elevated temperature, the control method comprising the steps of:

when activation of said actuator is desired:
(a) applying a high voltage to the SMA element to initiate a transition from said deactivated state to said activated state, and monitoring a current through said element during the application of said high voltage;
(b) when the monitored current reaches a first threshold corresponding to a resistivity of said SMA element that occurs when said SMA element has attained said activated state, lowering the voltage applied to said SMA element, and monitoring the current through the element during application of said lowered voltage; and
(c) when the monitored current during the application of said lowered voltage reaches a second threshold corresponding to a resistivity of said SMA element that occurs prior to an onset of transition to said deactivated state, re-applying said high voltage and cyclically lowering said applied voltage in accordance with steps (b) and (c), so as to maintain the SMA element in a state of readiness to return to said deactivated state; and when deactivation of said actuator is desired, removing said applied voltage, and cooling said SMA element, so as to return said SMA element to said deactivated state.

2. The control method of claim 1, wherein said high voltage is higher than a voltage that would thermally damage said SMA element if sustained, thereby to quickly open said actuator.

3. The control method of claim 1, wherein the cyclic lowering of the applied voltage limits a peak temperature of said SMA element.

4. A control method for opening and closing a fluid valve having a SMA element that positions a valve element to a closed position when said SMA element is in an ambient temperature state and an open position when said SMA element is an elevated temperature state, the control method comprising the steps of:

when valve opening is desired:
(a) applying a high voltage to the SMA element to initiate movement of said valve element toward said open position, and monitoring a current through said element during the application of said high voltage;
(b) when the monitored current reaches a first threshold corresponding to a resistivity of said SMA element that occurs when said SMA element has attained said elevated temperature state, lowering the voltage applied to said SMA element, and monitoring the current through the element during application of said lowered voltage; and
(c) when the monitored current during the application of said low voltage reaches a second threshold corresponding to a resistivity of said SMA element that occurs prior to an onset of transition to said ambient temperature state, cyclically applying said high voltage and lowering said applied voltage in accordance with steps (b) and (c), so as to maintain the SMA element in a state of readiness to return to said ambient temperature state; and when valve closing is desired, removing said applied voltage, and cooling said SMA element, so as to return said SMA element to its ambient temperature state.

5. The control method of claim 4, wherein said high voltage is higher than a voltage that would thermally damage said SMA element if sustained, thereby to quickly open said valve.

6. The control method of claim 4, wherein the cyclic application of the high voltage and lowering of the applied voltage limits a peak temperature of said SMA element.

7. The control method of claim 4, wherein the cooling of said SMA element is achieved by a fluid controlled by said valve.

8. The control method of claim 7, wherein said first and second thresholds are adjusted based on a temperature of said controlled fluid so as to minimize temperature related variability in closing of said valve.

9. Control apparatus for opening and closing a valve having a SMA element that moves a valve element to a deactivated position when said SMA element is in an ambient temperature state and an activated position when said SMA element is in an elevated temperature state, the control apparatus comprising:

a voltage source;

a power transistor coupling said voltage source to said SMA element;

a bias circuit for biasing said power transistor to a conductive state to establish current flow through said SMA element while valve activation is commanded, the bias circuit being operative in a first state in which said power transistor applies a maximum voltage of said source across said SMA element, and a second state in which said power transistor applies a minimum voltage of said source across said SMA element; and a comparator connected to monitor current through said SMA element during the commanded open period of said injector for switching the bias circuit from said first state to said second state when the monitored current reaches a first threshold corresponding to a resistivity of said SMA element that occurs when said SMA element attains said elevated temperature state, and switching the bias circuit from said second state to said first state when the monitored current reaches a second threshold corresponding to a resistivity of said SMA element that occurs prior to an onset of transition to said ambient temperature state.

10. A control apparatus as set forth in claim 9, wherein said second threshold is determined by a characteristic hysteresis of said comparator.

11. The control apparatus of claim 9, wherein said maximum voltage is higher than a voltage that would thermally damage said SMA element if sustained, thereby to quickly move said valve element to said activated position when valve activation is commanded.

* * * * *